Feb. 13, 1968  C. S. NAGY ETAL  3,368,570
CONTROL SYSTEM FOR CHANGE-DISPENSING ACCOUNTING MACHINES
Filed Jan. 3, 1967  2 Sheets-Sheet 1

INVENTORS
CHARLES S. NAGY
LAYMON C. HOSKINS &
WILLIAM J. SCOTT
BY  Louis A. Kline
    Elmer Wargo
THEIR ATTORNEYS

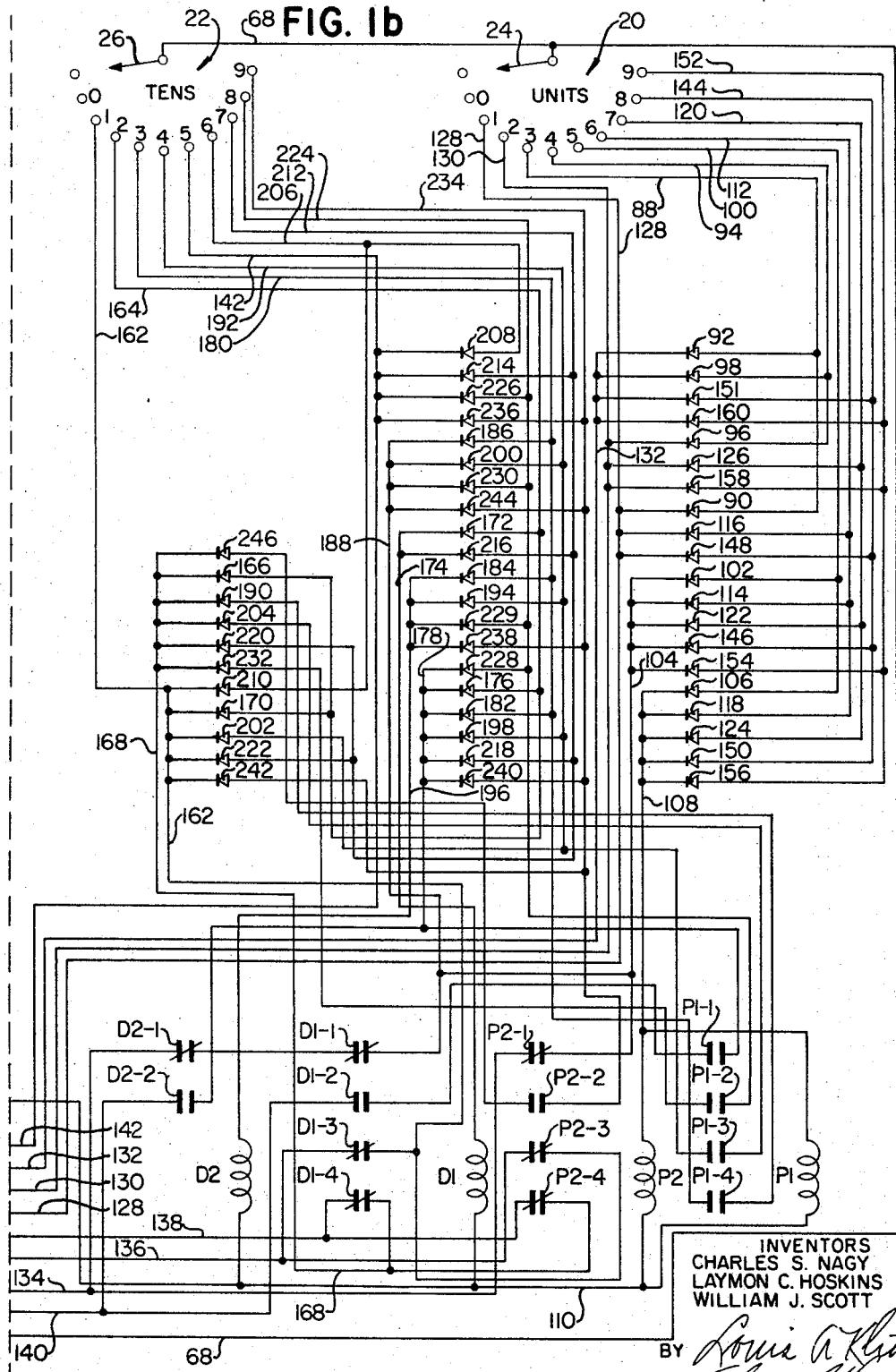

United States Patent Office 3,368,570
Patented Feb. 13, 1968

3,368,570
CONTROL SYSTEM FOR CHANGE-DISPENSING ACCOUNTING MACHINES
Charles S. Nagy and Laymon C. Hoskins, Dayton, and William J. Scott, Kettering, Ohio, assignors to The National Cash Register Company, Dayton, Ohio, a corporation of Maryland
Filed Jan. 3, 1967, Ser. No. 606,837
6 Claims. (Cl. 133—2)

ABSTRACT OF THE DISCLOSURE

An electrical circuit for a change-dispensing apparatus which may be used in connection with a cash register or an accounting machine. The circuit utilizes diodes in combination with solenoids which operate normally open and normally closed switches to actuate coin ejector mechanisms in accordance with the value of the change required, the value of the change being less than a dollar, and the change always being dispensed in the fewest number of coins.

Figure 1A:
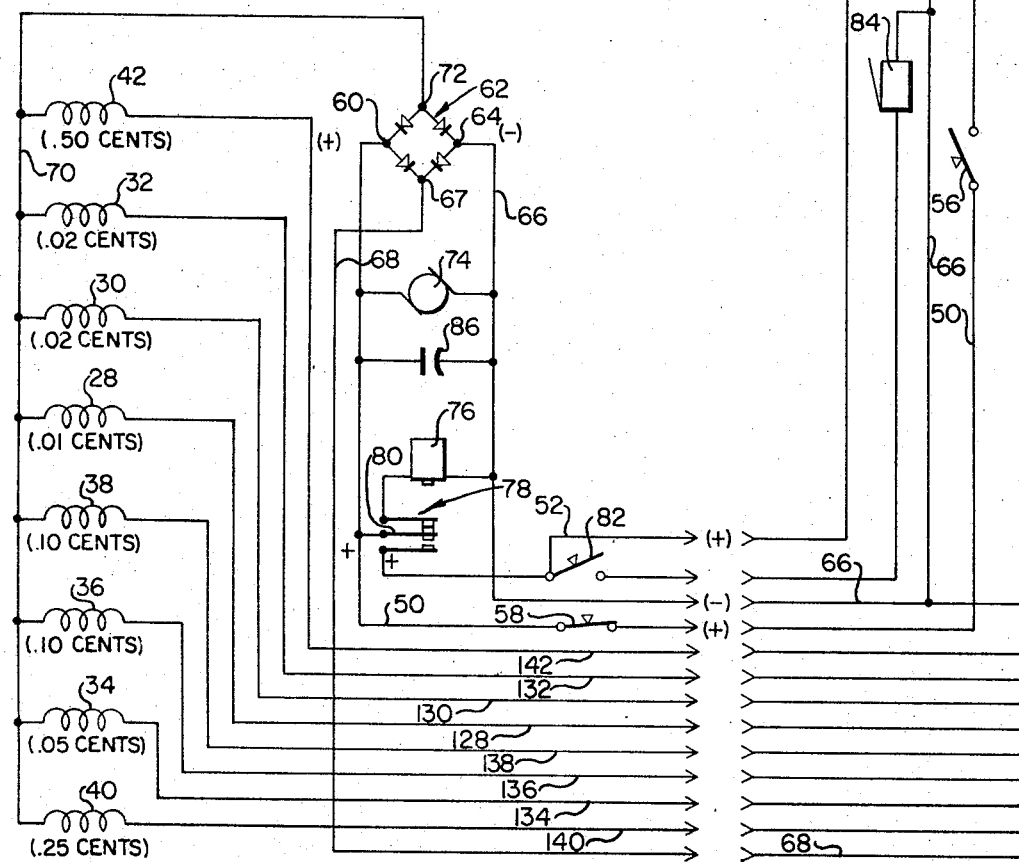

This invention relates to improvements in change-dispensing devices, and, more particularly, it relates to an electrical circuit for controlling coin ejector mechanisms so as to dispense change for less than a dollar in the fewest number of coins.

The electrical circuit of this invention is part of a change-dispensing mechanism which is especially adaptable for use with business machines such as cash registers or accounting machines. United States Patent No. 3,126,023, which issued Mar. 24, 1964, on the application of Charles S. Nagy, discloses how a change-dispensing mechanism is used in connection with an accounting machine.

In general, change-dispensing mechanisms of the above type are used with business machines having an add-subtract totalizer, into which transactions are appropriately added and from which transactions are subtracted, resulting in an amount present on the totalizer which reflects the amount of change to be dispensed. Each bank of the totalizer comprising the amount of change to be dispensed is operatively connected with a separate input switch which provides the input to the change-dispensing mechanism. For example, if change is to be dispensed in United States of America coins, a separate input switch is provided for the dimes' bank of the totalizer, and a separate switch is provided for the cents' bank. As the specific means operatively connecting each bank of the totalizer with its respective said input switch in the coin-dispensing mechanism is not a part of this invention, any suitable connecting means may be used.

Applicants' invention generally relates to an electrical circuit for controlling coin ejector mechanisms so as to dispense change for less than a dollar in the smallest number of coins. The circuit, which is divided into first and second circuit portions, also includes first and second input switch means, each said switch means having a plurality of input contacts corresponding to the change to be dispensed. The ejector mechanisms which are controlled by said circuit portions are divided into first and second groups, the first and second circuit portions respectively controlling said groups. The first circuit portion also includes first solenoid means which actuate first switch means for controlling said first group of ejectors, and, similarly, the second circuit portion includes second solenoid means which actuate second switch means for controlling said second group of ejectors. One of the ejector mechanisms (the one for ejecting a five-cent piece) is operatively connected to both first and second circuit portions, as this is necessary for providing change in the fewest number of coins. The inputs of said input switch means are isolated from one another by conventional diodes, and the entire circuit arrangement is easily adaptable to existing business machines.

The objectives of this invention are as follows:
(a) To provide an electrical circuit for a change-dispensing apparatus, which circuit is economical to manufacture;
(b) To provide an electrical circuit for a change-dispensing apparatus which circuit facilitates the addition of the change-dispensing apparatus to business machines such as cash registers and accounting machines.

These and other objects and advantages will be more readily understood in connection with the following description and the drawings, in which:

FIGS. 1a and 1b when viewed together constitute the electrical circuit of this invention.

FIGS. 1a and 1b, when viewed together, constitute the electrical circuit of this invention, which is part of a change-dispensing apparatus which is especially useful with business machines such as cash registers or accounting machines. The electrical circuit shown is adapted for dispensing change up to and including 99 cents in the fewest number of United States of America coins.

As previously mentioned, the input to the electrical circuit of this invention includes two input switch means; namely, the rotary switches 20 and 22. The rotary switch 20 is operatively connected with the cents' bank of the add-subtract totalizer (not shown) of the business machine with which the coin-dispensing mechanism is used, so that the rotary wiper blade 24 of the switch 20 engages the appropriate one of the contacts 0 to 9 corresponding to the value of the change to be dispensed. For example, if the cents' bank of the add-subtract totalizer indicates that four cents of change is to be dispensed, the wiper blade 24 of the switch 20 is set to engage the contact marked 4. In a similar manner, if the dimes' bank of the add-subtract totalizer indicates that twenty cents of change is to be dispensed, the wiper blade 26 of rotary switch 22 engages the contact marked 2. The contacts on the switch 22 are arranged in the same manner as are the contacts of the switch 20.

The coin ejectors used with the electrical circuit of this invention are arranged in first and second groups, only the solenoid of each ejector being shown in FIG. 1a, as the ejector mechanism is conventional and does not form a part of this invention. When the particular solenoid is energized, it actuates its associated ejector mechanism to dispense the appropriate coin or coins.

The first group of ejectors, as represented by their respective solenoids (FIG. 1a), includes:

solenoid 28 for dispensing one cent;
solenoid 30 for dispensing two cents;
solenoid 32 for dispensing two cents; and
solenoid 34 for dispensing five cents (a nickel).

The second group of ejectors as represented by their respective solenoids (FIG. 1a) includes:

solenoid 36 for dispensing ten cents (a dime);
solenoid 38 for dispensing ten cents (a dime);
solenoid 40 for dispensing twenty-five cents (a quarter); and
solenoid 42 for dispensing fifty cents (a half-dollar).

The electrical circuit of this invention also includes first and second solenoid means which are operative in response to the energization of selected ones of the contacts of the rotary switches 20 and 22, respectively. When energized, these solenoid means control various switches (to be described) which in turn control the particular ejectors of the first and second groups which are to be actuated to dispense coins in accordance with the amount of change to be dispensed as recorded upon the cents' and dimes' banks of the add-subtract totalizer of the business machine with which the coin dispenser is used.

Included in the first solenoid means are solenoids P1 and P2, as shown in FIG. 1b. When energized, the solenoid P1 closes its associated, normally-open switches P1–1, P1–2, P1–3, and P1–4. When the solenoid P2 is energized, its associated, normally-open switch P2–2 will be closed, and its associated, normally-closed switches P2–1, P2–3, and P2–4 will be opened. The functioning of these switches to obtain the desired change will be described later.

The second solenoid means, which is operative in response to energization of selected ones of the contacts of the rotary switch 22, includes the solenoids D1 and D2, as shown in FIG. 1b. When energized, the solenoid D1 opens its associated, normally-closed switches D1–1, D1–3, and D1–4 and closes its normally-open switch D1–2. When the solenoid D2 is energized, its associated, normally-closed switch D2–1 will be opened, and its associated, normally-open switch D2–2 will be closed. The functioning of these switches and solenoids to obtain the desired change will be described later.

The current for energizing the various solenoids operating the particular coin ejectors is supplied as follows. Input terminals 44 and 46 (FIG. 1a) are connected to a source of potential V. A fuse 48 has one end connected to the terminal 44, and its other end is connected to one end of conductors 50 and 52. The conductor 50 has switches 54, 56, and 58 in series therewith, and the remaining end of the conductor is connected to the terminal 60 of a conventional bridge rectifier 62. From the opposite terminal 64 of the rectifier 62, a conductor 66 is connected to the input terminal 46. A conductor 68 connects one output terminal 67 of the rectifier 62 with the wiper blades 24 and 26 of the rotary switches 20 and 22, respectively. As the wiper blades 24 and 26 engage their respective contacts, current passes over circuit means, to be later described, and eventually passes over conductors 140, 134, 136, 138, 128, 130, 132, and 142, which lead to the solenoids, 40, 34, 36, 38, 28, 30, 32, and 42, respectively to energize them and thereby actuate the associated coin ejectors (not shown). One terminal of each of said last-named solenoids is connected to a common conductor 70, which is connected to the remaining terminal 72 of the rectifier 62.

The functioning of the change-dispensing mechanism relative to a business machine with which it is operatively connected is described in the previously-named United States patent; however, a brief explanation of this functioning will be made, so that the electrical circuit as disclosed herein will be more readily understood. When change is to be dispensed, the previously-mentioned business machine will have run through its appropriate cycles, so that the value of change to be dispensed will be recorded on the appropriate banks of the add-subtract totalizer of the machine, as previously explained. At this time, the switch 54 (FIG. 1a) is closed by some conventional connecting means (not shown), which is operatively connected with an operating cam line in the machine. The person operating the machine then actuates an appropriate transaction key on the machine to dispense the change. Actuation of said transaction key closes the switch 56 (FIG. 1a) to energize the conductor 68 (via the rectifier 62) leading to the rotary switches 20 and 22, whose wiper blades have been set in accordance with the value of change to be dispensed as recorded in the cents' and dimes' banks, respectively, of said add-subtract totalizer.

After the closing of the switches 54 and 56 to energize the ejector mechanisms, a motor 74 (connected across the conductors 50 and 66) is energized. At the same time, a clutch solenoid 76 is also energized to operatively connect the motor 74 with the actual coin ejectors (not shown), so that the ejectors, whose solenoids (40, 34, 36, 38, 28, 30, 32, 42) are energized, are actuated to conventionally eject their respective coins. The clutch solenoid 76 is initially energized by current passing over the conductor 50, through one side of a single pole, double throw switch 78, and to the conductor 66. After the motor 74 is in operation to eject the coins, a cam (not shown) in the ejector mechanism pivots the movable arm 80 of the switch 78 to the opposite terminal of that shown in FIG. 1a to thereby connect the arm 80 with the conductor 52, which provides on alternate energization route to keep the motor 74 running and the clutch solenoid 76 energized. While the motor 74 is still running, the switches 54 and 56 in series with the conductor 50 will open, due to the usual cycling of the business machine, and, after a completion of the usual ejection cycle of the ejector mechanism, said cam therein will pivot the switch arm 80 to the position shown in FIG. 1a and thereby deenergize the clutch solenoid 76 and the motor 74. The ejector mechanism is then ready to repeat the ejection cycle.

The ejector mechanism has a conventional normally-open switch 82, which closes when the level of coins in said mechanism reaches a low point to thereby connect a buzzer 84 between the conductors 52 and 66 to indicate the shortage. Should no coins be present in any one of the ejectors of said mechanism, the normally-closed switch 58 is opened by conventional techniques to prevent energization of the coin dispenser. A conventional capacitor 86 is provided for spark suppression in the circuit of the motor 74.

The functioning of the electrical circuit of this invention will now be described by a series of examples in which the change to be dispensed ranges from one cent to 99 cents. In each of the examples, the wiper blades 24 and 26 of the rotary switches 20 and 22, respectively, have been positioned on their appropriate contacts corresponding to the change to be dispensed as recorded on the cents' and dimes' banks of the add-subtract totalizer of the business machine with which the circuit is used. How the energizing circuit from the wiper blades 24 and 26 is completed to the pertaining solenoids for the ejector mechanisms will now be described.

When one cent in change is to be dispensed, the wiper blade 24 on the rotary switch 20 engages the contact marked 1 to complete an energizing circuit over the conductor 128 to the solenoid 28 of the pertaining ejector mechanism to thereby eject one cent, as previously explained.

When two cents in change is to be dispensed, the wiper blade 24 on the rotary switch 20 engages the contact marked 2 to complete an energizing circuit over the conductor 130 to the solenoid 30 of the pertaining ejector mechanism to thereby eject two cents.

When three cents in change is to be dispensed, the wiper blade 24 on the rotary switch 20 engages the contact marked 3 to complete an energizing circuit over a conductor 88, through a diode 90, over the conductor 128 to the solenoid 28 to thereby eject one cent. A second energizing circuit from said contact marked 3 is completed over the conductor 88, through a diode 92, and over the conductor 132 to the solenoid 32 of the pertaining ejector mechanism to thereby eject two cents, which, when combined with the one cent dispensed, make a total of three cents.

When four cents in change is to be dispensed, the wiper blade 24 on the rotary switch 20 engages the contact marked 4 to complete an energizing circuit over a conductor 94, through a diode 96, and over the conductor 130 to the solenoid 30 of the pertaining ejector mechanism to thereby eject two cents. A second energizing circuit from said contact marked 4 is completed over the conductor 94, through the diode 98, to the conductor 132 to the solenoid 32 of the pertaining ejector mechanism to thereby eject two cents, which, when combined with the two cents dispensed by the solenoid 30, make a total of four cents.

When five cents, or a nickel, in change is to be dispensed, the wiper blade 24 on the rotary switch 20 engages the contact marked 5 to complete an energizing circuit over a conductor 100, through a diode 102, over a conductor 104, over normally-closed switch D1–1, over normally closed switch D2–1, and over the conductor 134 to the solenoid 34 of the pertaining ejector mechanism to thereby eject a nickel.

The first solenoid means previously mentioned includes solenoids P1 and P2, which are energized each time the wiper blade 24 of the rotary switch 20 engages the contact marked 5. These solenoids P1 and P2 are energized by a current passing over the conductor 100, through a diode 106, and over a conductor 108 to said solenoids. A return conductor 110 is used to connect the solenoids P1 and P2 to the input terminal 46 via the conductor 66.

When the solenoids P1 and P2 are energized, as mentioned in the previous paragraph, the normally-closed switch P2–1, operatively associated with the solenoid P2, opens and thereby opens one of two energizing paths leading to the solenoid 34; however, as the solenoids D1 and D2 have not been energized when five cents in change is dispensed, their normally-closed switches D1–1 and D2–1, in series with each other, provide the necessary energizing path to the solenoid 34.

When six cents in change is to be dispensed, the wiper blade 24 on the rotary switch 20 engages the contact marked 6 to complete an energizing circuit over a conductor 112 through a diode 114 over the conductor 104 and the balance of the circuit, as previously explained, to energize the solenoid 34 of the pertaining ejector mechanism, which dispenses a nickel. To dispense the remaining one cent to make a total of six cents, a diode 116, connected from the conductor 112 to the conductor 128, lets the energizing current through to the solenoid 28 of the pertaining ejector mechanism, which ejects a cent. A diode 118 lets the energizing current from the conductor 112 to the conductor 108 to the solenoids P1 and P2 for the functions explained in relation to the dispensing of five cents.

When seven to nine cents in change is to be dispensed, the techniques employed for change dispensing are the same as those already explained. For seven cents, the solenoids 34 and 30 of the pertaining ejector mechanisms are energized to dispense a nickel and two cents, respectively. For eight cents, the solenoids 34, 32, and 28 of the pertaining ejector mechanisms are energized to dispense a nickel, two cents, and one cent, respectively. For nine cents, the solenoids 34, 32, and 30 of the pertaining ejector mechanism are energized to dispense a nickel, two cents, and two cents, rspectively. The connections to effect the coin dispensing described in this paragraph are as follows. The energizing current from the contact 7 of the rotary switch 20 passes over a conductor 120, through a diode 122, over the conductor 104, over the normally-closed switches D1–1 and D2–1 to the conductor 134 and to said solenoid 34. From the conductor 120, the energizing current passes through a diode 124 and over the conductor 108 to the solenoids P1 and P2. From the conductor 120, the energizing current also passes through a diode 126 to the conductor 130, previously mentioned. The energizing current from the contact 8 of the rotary switch 20 passes over a conductor 144 and through a diode 146 to the conductor 104, previously mentioned. From the conductor 144, the energizing current also passes through a diode 148 to the conductor 128, previously mentioned. Also, from the conductor 144, the energizing current passes through (a) a diode 150 to the conductor 108, previously mentioned; and (b) a diode 151 to the conductor 132. The energizing current from the contact 9 of the rotary switch 20 passes over a conductor 152 (a) through a diode 154 to the conductor 104, previously mentioned; (b) through a diode 156 to the conductor 108, previously mentioned; (c) through a diode 158 to a conductor 130; and (d) through a diode 160 to the conductor 132.

When ten cents, or a dime, in change is to be dispensed, the wiper blade 26 on the rotary switch 22 engages the contact marked 1 to complete an energizing circuit over a conductor 162, over the normally-closed switch D1–3 of the solenoid D1 to the conductor 136 and to the solenoid 36 of the pertaining ejector mechanism to eject a dime. A second energizing circuit route from the conductor 162 over the normally-closed switch P2–3 of the solenoid P2 is also available, as neither solenoid D1 nor solenoid P2 is energized when ten cents is dispensed.

When eleven cents to nineteen cents in change is to be dispensed, the techniques employed for dispensing are the same as those already explained. Ten cents, or a dime, is dispensed via the rotary switch 22, and the remaining change (one cent to nine cents) is dispensed via the rotary switch 20.

The twenty cents in change is to be dispensed, the wiper blade 26 on the rotary switch 22 engages the contact marked 2 to complete an energizing circuit over a conductor 164, through a diode 166, over a conductor 168, over the normally-closed switch P2–4, and over the conductor 138 to the solenoid 38 of the pertaining ejector mechanism to eject a dime. At the same time, an energizing circuit is completed from the conductor 164, through a diode 170, to the conductor 162, over the normally-closed switch P2–3, and over the conductor 136 to the solenoid 36 of the pertaining ejector mechanism to eject a dime, making the total change twenty cents. From the conductor 164, an energizing current passes through a diode 172 over a conductor 174 to the solenoid D1. Energization of the solenoid D1 opens the normally-closed switch D1–4 to open one of two conducting paths from the conductor 168 to the conductor 138, the other path being over the normally-closed switch P2–4, already mentioned. Energization of the solenoid D1 also opens the normally-closed switch D1–3 to open one of two conducting paths from the conductor 162 to the conductor 136. From the conductor 164, the energizing current passes through a diode 176 to a conductor 178. From the conductor 178, the energizing current may pass to the conductor 140 over one of two paths leading to the solenoid 40 for dispensing twenty-five cents, or a quarter, under certain conditions, to be described later. One of these paths, from the conductor 178, includes the normally-open switch P1–1 in series with the normally-open switch D1–2 leading to the conductor 140. The other path, from the conductor 178, includes the normally-open switch D2–2 leading to the conductor 140.

When twenty-one to twenty-four cents in change is to be dispensed, the wiper blade 26 on the rotary switch 22 engages the contact marked 2 to dispense twenty cents, or two dimes, as explained in the previous paragraph. The wiper blade 24 of the rotary switch 20 engages the contacts marked 1 to 4 to dispense one, two, three, and four cents, respectively, as previously explained, making up the total of twenty-one cents to twenty-four cents.

When twenty-five cents in change is to be dispensed, the wiper blade 26 on the rotary switch 22 engages the contact marked 2, and the wiper blade 24 on the rotary switch 20 engages the contact marked 5. When this latter contact marked 5 is energized, the solenoids P1 and P2 are energized, as previously explained, and, when said contact marked 2 is energized, the solenoid D1 is energized to actuate its related switches as follows. The solenoids 36 and 38, which would normally dispense a dime to make up twenty cents, are prevented from being energized by the opening of the normally-closed switches D1–3 and P2–3 in circuit with the solenoid 36, and by the opening of the normally-closed switches D1–4 and P2–4 in circuit with the solenoid 38. From the conductor 178 (from contact 2 of the rotary switch 22), an energizing current passes over the now-closed, normally-open switch P1–1, and the now-closed normally-open switch D1–2 to the conductor 140 to the solenoid 40 of the pertaining ejector mechanism to eject twenty-five cents, or a quarter. Because the rotary switch 20 is set to discharge five cents, or a nickel, the solenoid 34 (to dispense a nickel) would normally be energized; however, because the solenoid D1 is energized, its normally closed switch D1–1 is opened to break one of two parallel paths leading to the solenoid 34. The remaining path is interrupted by the opening of the normally-closed switch P2–1 associated with the solenoid P2.

When twenty-six cents to twenty-nine cents in change is to be dispensed, the techniques employed are the same as those disclosed in relation to the dispensing of twenty-five cents, or a quarter, except that, in addition, the solenoids for making up the cents are actuated by the same techniques already described in relation to the dispensing of six to nine cents, except that the solenoid 34 for dispensing a nickel is not actuated, due to the opening of the normally closed switches P2–1 and D1–1, as previously explained. The solenoids for dispensing the cents are actuated as follows. For twenty-six cents, the solenoid 28 is energized, enabling the related ejector mechanism to dispense one cent, which, when combined with the quarter, makes up twenty-six cents. Similarly, for twenty-seven cents, the solenoid 30 is energized to dispense two cents. For twenty-eight cents, the solenoids 28 and 32 are energized to dispense one cent and two cents, respectively. Finally, for twenty-nine cents, the solenoids 30 and 32 are energized to each dispense two cents.

When thirty cents in change is to be dispensed, the wiper blade 26 on the rotary switch 22 engages the contact marked 3 to complete an energizing circuit over the conductor 180, through a diode 182, over the conductor 178, over the closed, normally-open switch D2–2, and over the conductor 140 to the solenoid 40 of the pertaining ejector mechanism to eject a quarter. The solenoid D2, which controls the switch D2–2, is energized by a current passing over the conductor 180 and through a diode 184. From the conductor 180, the energizing current also passes through a diode 186, over the normally-closed switch P2–1, and over the conductor 134 to the solenoid 34 of the pertaining ejector mechanism to eject a nickel to make a total of thirty cents when combined with the quarter also dispensed.

When thirty-one to thirty-four cents in change is to be dispensed, the techniques employed are the same as those already described for dispensing thirty cents plus the cents ranging from one to four, respectively.

When thirty-five cents in change is to be dispensed, the wiper blade 26 of the rotary switch 22 engages the contact marked 3, and the wiper blade 24 of the rotary switch 20 engages the contact marked 5. By this combination of settings on said switches, the solenoids P1, P2, and D2 are energized, as previously explained. The energizing circuit for the solenoid 40 for dispensing a quarter of thirty-five cents change is the same as it was in dispensing thirty cents. Because the solenoid P2 is energized, its associated, normally-closed switch P2–1 is opened to break one of two conducting paths to the solenoid 34 for dispensing a nickel. The other path to the solenoid 34 from the conductor 188 is interrupted by the opening of the normally-closed switch D2–1, which is operatively associated with the solenoid D2. Because the solenoid P1 is energized, an energizing current from the conductor 180 passes over the now-closed, normally-open switch P1–4, through a diode 190, over the conductor 168, over the normally-closed switch D1–4, and over the conductor 138 to the solenoid 38 of the pertaining ejector mechanism to eject ten cents, or a dime, to make a total of thirty-five cents when combined with the quarter also dispensed.

When thirty-six to thirty-nine cents in change is to be dispensed, the techniques employed are the same as those which are disclosed in relation to the dispensing of thirty-five cents, except that, in addition, the solenoids for dispensing the cents to make up the respective amounts (when added to thirty-five cents) are also energized. When the wiper blade 24 of the rotary switch 20 engages the contacts marked 6, 7, 8, and 9 (while the wiper blade 26 on the rotary switch 22 engages the contact marked 3), the solenoid 34 (to eject a nickel) is not energized, due to the opening of the normally closed switches P2–1 and D2–1; however, the solenoids for dispensing the cents are energized, as previously described. For example, when thirty-six cents in change is to be dispensed, the solenoid 28 is energized, and its related ejector mechanism dispenses a cent, making a total of thirty-six cents when added to the thirty-five cents also dispensed.

When forty cents in change is to be dispensed, the wiper blade 26 on the rotary switch 22 engages the contact marked 4, and the wiper blade 24 on the rotary switch 20 engages the contact marked 0. By this combination of settings on the switches, the solenoid D2 is energized by an energizing current from the contact 4 of the switch 22 passing over a conductor 192, through a diode 194, and over a conductor 196 to one end of the solenoid D2. With the energization of the solenoid D2, its associated, normally-open switch D2–2 is closed to provide an energizing circuit to the solenoid 40 over the conductor 192, through a diode 198, over the conductor 178, over the now-closed switch D2–2, and over the conductor 140 to the solenoid 40 of the pertaining ejector mechanism to dispense a quarter. From the conductor 192, the energizing current also passes through a diode 200, over the conductor 188, and over the normally-closed switch P2–1 to the solenoid 34 of the pertaining ejector mechanism to eject a nickel, making the total change dispensed so far equal to thirty cents. From the conductor 192, the energizing current also passes through a diode 202, over the conductor 168, over both of the normally-closed switches D1–3 and P2–3, and over the conductor 136 to the solenoid 36 of the pertaining ejector mechanism to eject ten cents, or a dime, making a total of forty cents when combined with the quarter and the nickel also dispensed.

When forty-one to forty-four cents in change is to be dispensed, the techniques employed are the same as those already described in dispensing forty cents plus the cents ranging from one to four, respectively.

When forty-five cents in change is to be dispensed, the wiper blade 26 of the switch 22 engages the contact marked 4, and the wiper blade 24 of the rotary switch 20 engages the contact marked 5. By this combination of settings on said switches, the solenoids P1 and P2 are also energized, in addition to the solenoid D2, which is energized as previously explained in relation to the dispensing of forty cents. With the wiper arm 24 on the contact marked 5, a nickel would normally be dispensed via the solenoid 34; however, because the solenoid P2 has been energized, its normally-closed switch P2–1 is opened to break one of two conducting paths to the solenoid 34. The other path to the solenoid 34 is opened through the energization of the solenoid D2, which opens its associated normally-closed switch D2–1. From the conductor 192, the energizing current passes over the now-closed normally-open switch P1–3, through a diode 204, over the conductor 168 and over the normally-closed switch D1–4 (which is associated with the solenoid D1) to the solenoid 38 of the pertaining ejector mechanism to eject a dime to make a total of forty-five cents when combined with the quarter and the dime normally dispensed in the dispensing of forty cents.

When forty-six to forty-nine cents in change is to be dispensed, the techniques employed are the same as those employed in the dispensing of forty-five cents, except that, in addition, the solenoids for dispensing the cents to make up the respective amounts (when added to forty-five cents) are also energized. This technique is disclosed previously in relation to the dispensing of thirty-six to thirty-nine cents in change.

When fifty cents in change is to be dispensed, the wiper blade 26 on the rotary switch 22 engages the contact marked 5 to complete an energizing current over the conductor 142 to the solenoid 42 of the pertaining ejector mechanism to eject fifty cents in one coin.

When fifty-one to fifty-nine cents in change is to be dispensed, the techniques employed are the same as those already explained. Fifty cents is dispensed via the rotary switch 22, and the remaining change (one cent to nine cents) is dispensed via the rotary switch 20, as previously explained in relation to these amounts.

When sixty cents in change is to be dispensed, the wiper blade 26 on the rotary switch 22 engages the contact marked 6 to complete an energizing current over the conductor 206, through a diode 208, and over the conductor 142 to the solenoid 42 of the pertaining ejector mechanism to dispense fifty cents in one coin. From the conductor 206, the energizing current also passes through a diode 210, over the conductor 162, and over both normally-closed switches D1-3 and P2-3, which provide two conducting paths to the solenoid 36 of the pertaining ejector mechanism to dispense ten cents, or a dime, to make a total of sixty cents in change when combined with the fifty cents also dispensed.

When sixty-one to sixty-nine cents in change is to be dispensed, the techniques employed are the same as those already explained. Sixty cents is dispensed as explained in the previous paragraph, and the remaining change (one cent to nine cents) is dispensed via the rotary switch 20, as previously explained in relation to the dispensing of one to nine cents alone.

When seventy cents in change is to be dispensed, the wiper blade 26 on the rotary switch 22 engages the contact marked 7, and the wiper blade 24 of the rotary switch 20 engages the contact marked 0, which always remains unconnected to anything. From said contact marked 7, an energizing current passes over a conductor 212, through a diode 214, and over the conductor 142 to the solenoid 42 of the pertaining ejector mechanism to eject fifty cents in one coin. The energizing current passing over the conductor 212 also passes through a diode 216 and over the conductor 174 to the solenoid D1 to energize it, thereby opening the normally-closed switches D1-4 and D1-3 and closing the normally-open switch D1-2. To obtain the two dimes necessary to make up the amount of seventy cents, the solenoids 38 and 36 are energized as follows. Even though the switch D1-4, providing one of two circuits to the solenoid 38, is opened, the energizing current from the conductor 212 passes through a diode 220 and over the second circuit, including the normally-closed switch P2-4, to the solenoid 38 of the pertaining ejector mechanism to eject one dime. The solenoid 36 is energized by the energizing current from the conductor 212 passing through a diode 222, over the conductor 162, and over the normally-closed switch P2-3, the normally-closed switch D1-3 being open at this time due to the energization of the solenoid D1. When the solenoid 36 is energized, its pertaining ejector mechanism dispenses a dime to make a total of seventy cents change when combined with the dime dispensed by the solenoid 38 and the half-dollar dispensed by the solenoid 42.

When seventy-one cents to seventy-four cents in change is to be dispensed, the techniques employed are the same as those already explained in relation to the dispensing of seventy cents. To this amount, one to four cents are added (depending upon the position of the wiper blade 24 of the rotary switch 20) to make up the total of seventy-one to seventy-four cents, respectively.

When seventy-five cents in change is to be dispensed, the wiper blade 26 on the rotary switch 22 engages the contact marked 7, and the wiper blade 24 on the rotary switch 20 engages the contact marked 5. From this latter contact, the energizing current passes over the conductor 100, through the diode 106, and over the conductor 108 to the solenoids P1 and P2 to energize them. The solenoid D1 also is energized, as explained in relation to the dispensing of seventy cents in change. Because the solenoids P1, P2 and D1 are energized, the normally-closed switches P2-4 and D1-4 are opened to interrupt both conducting paths to the solenoid 38, and no dime is dispensed. Similarly, the normally-closed switches P2-3 and D1-3 are opened to interrupt both conducting paths to the solenoid 36, which would ordinarily eject a dime when seventy cents in change is dispensed. However, because the solenoids D1 and P1 are energized, the associated switches D1-2 and P1-1, respectively, in series with each other, provide a conducting path to energize the solenoid 40 by an energizing current passing over the conductor 212, through a diode 218, over the conductor 178 and said switches D1-2 and P1-1 to the solenoid 40. When the solenoid 40 is energized, its pertaining ejector mechanism dispenses twenty-five cents in one coin. Fifty cents in one coin is also dispensed via the solenoid 42 by the techniques previously discussed in relation to the dispensing of seventy cents. Because the wiper blade 24 of the switch 20 engages the contact marked 5, a nickel would normally be dispensed; however, because the solenoids P2 and D1 are energized as explained in this paragraph, a first conducting path to the solenoid 34 (to eject a nickel) is interrupted by the opening of the normally-closed switch P2-1, and the second path is interrupted by the opening of the normally-closed switch D1-1 in series with the normally closed switch D2-1.

When seventy-six to seventy-nine cents in change is to be dispensed, the techniques employed are the same as those already explained in relation to the dispensing of seventy-five cents; however, in addition to this amount of change, one to four cents in change are also dispensed in accordance with the setting of the wiper blade 24 of the rotary switch 20. Because the nickel ejection solenoid 34 is prevented from being energized, as explained in the previous paragraph, only the solenoids for ejecting the cents for the settings of the contacts 6 to 9 of the rotary switch 20 are energized, enabling the pertaining ejector mechanisms to eject the appropriate amount of cents. For example, in making seventy-six cents in change, a half-dollar, a quarter, and one cent are dispensed.

When eighty cents in change is to be dispensed, the wiper blade 26 on the rotary switch 22 engages the contact marked 8 to complete an energizing circuit over a conductor 224, through a diode 226, and over the conductor 142 to the solenoid 42 of the pertaining ejector mechanism to eject fifty cents in one coin. From the conductor 224, the energizing current also passes through a diode 228, over the conductor 178, over the now-closed, normally-open switch D2-2 to energize the solenoid 40 of the pertaining ejector mechanism to eject twenty-five cents in one coin. The normally-open switch D2-2 is operatively associated with the solenoid D2, which is energized by the energizing current passing over the conductor 224, through a diode 229, and over the conductor 196. The remaining five cents, or nickel, to make up the total of eighty cents in change is obtained by the energizing current from the conductor 224 passing through a diode 230, over the conductor 188, and over the normally-closed switch P2-1 to the solenoid 34 of the pertaining ejector mechanism.

When eighty-one to eighty-four cents in change is to be dispensed, the techniques employed are the same as those already discussed in the previous paragraph relating to the dispensing of eighty cents; however, in addition to this amount of change, one to four cents in change is also dispensed in accordance with which one of the contacts marked 1 to 4, the wiper blade 24 of the rotary switch 20 engages to make up a total of eighty-one to eighty-four cents, respectively.

When eighty-five cents in change is to be dispensed, the wiper blade 26 of the rotary switch 22 engages the contact marked 8, and the wiper blade 24 of the rotary switch 20 engages the contact marked 5. From this latter contact, the energizing current passes over the conductor 100 to energize the solenoids P1 and P2, as previously explained. The solenoid D2 is also energized, as was explained in relation to the dispensing of eighty cents. The energization of the solenoids P2 and D2 is effective to open the normally-closed switch P2–1, breaking one circuit to the solenoid 34 (for dispensing a nickel) and to open the normally-closed switch D2–1, respectively, thereby breaking the second circuit to the solenoid 34. From the conductor 224, the energizing current passes over the now-closed, normally-open switch P1–2, through a diode 232, over the conductor 168, through the normally-closed switch D1–4, and over the conductor 138 to the solenoid 38 of the pertaining ejector mechanism to eject ten cents in one coin. Fifty cents in one coin and twenty-five cents in one coin are dispensed as previously explained in relation to the dispensing of eighty cents to now make a total of eighty-five cents in change when combined with the ten cents mentioned in the previous sentence.

When eighty-six to eighty-nine cents in change is to be dispensed, the techniques employed are the same as those already explained in relation to the dispensing of eighty-five cents; however, in addition to this amount of change, one to four cents in change are also dispensed in accordance with the setting of the wiper blade 24 of the rotary switch 20, as previously explained in relation to the dispensing of seventy-six to seventy-nine cents in change.

When ninety cents in change is to be dispensed, the wiper blade 26 on the rotary switch 22 engages the contact marked 9 to complete an energizing current over a conductor 234, through a diode 236, and over the conductor 142 to the solenoid 42 of the pertaining ejector mechanism to eject fifty cents in one coin. From the conductor 234, the energizing current passes through a diode 238 and over the conductor 196 to the solenoid D2 to energize it and thereby actuate its associated switches. The energizing current from the conductor 234 also passes through a diode 240, over the conductor 178, over the now-closed, normally-open switch D2–2 (closed by the energization of the solenoid D2), and over the conductor 140 to the solenoid 40 of the pertaining ejector mechanism to eject twenty-five cents in one coin. Also, from the conductor 234, the energizing current passes through a diode 242, over the conductor 162, over the normally-closed switch D1–3 (one of two conducting paths to the conductor 136), and over the conductor 136 to the solenoid 36 of the pertaining ejector mechanism to dispense ten cents in one coin, the other conducting path from the conductor 162 being over the normally-closed switch P2–3 to the conductor 136. From the conductor 234, the energizing current passes through a diode 244, over the conductor 188, over the normally-closed switch P2–1, and over the conductor 134 to the solenoid 34 of the pertaining ejector mechanism to eject five cents in one coin, which, when combined with the fifty cents, twenty-five cents, and ten cents also dispensed, make a total of ninety cents in change.

When ninety-one to ninety-four cents in change is to be dispensed, the techniques employed are the same as those already explained in the previous paragraph relating to the dispensing of ninety cents; however, in addition to this amount of change, one to four cents in change is dispensed in accordance with which one of the contacts marked 1 to 4, the wiper blade 24 of the rotary switch 20 engages to make up a total of ninety-one to ninety-four cents, respectively.

When ninety-five cents in change is to be dispensed, the wiper blade 26 of the rotary switch 22 engages the contact marked 9, and the wiper blade 24 of the rotary switch 20 engages the contact marked 5. From this latter contact, the energizing current passes over the conductor 100 to energize the solenoids P1 and P2, as previously explained. The solenoid D2 is already energized, as was explained in relation to the dispensing of ninety cents. The energization of the solenoids P2 and D2 is effective to open the normally-closed switch P2–1, breaking one circuit to the solenoid 34 (for dispensing a nickel) and to open the normally-closed switch D2–1, respectively, thereby breaking the second circuit to the solenoid 34. From the conductor 234, the energizing current passes through the now-closed, normally-open switch P2–2 (closed by the energization of the solenoid P2) through a diode 246, over the conductor 168, over the normally-closed switch D1–4, and over the conductor 138 to the solenoid 38 of the pertaining ejector mechanism to eject ten cents in one coin. Fifty cents in one coin, twenty-five cents in one coin, and ten cents in one coin are dispensed, as previously explained in relation to the dispensing of ninety-cents to now make a total of ninety-five cents when combined with the ten cents dispensed in the previous sentence.

When ninety-six to ninety-nine cents in change is to be dispensed, the techniques employed are the same as those already explained in relation to the dispensing of ninety-five cents; however, in addition to this amount of change, one to four cents in change are also dispensed in accordance with the setting of the wiper blade 24 of the rotary switch 20, as previously explained in relation to the dispensing of seventy-six to seventy-nine cents in change.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a change-dispensing system having first and second groups of ejectors for dispensing coins of different denominations and having first and second input switch means with each of said switch means having a plurality of inputs corresponding to the change to be dispensed, the improvement comprising
circuit means for controlling said ejectors;
said circuit means comprising:
first solenoid means operative in response to energization of selected ones of said inputs of said first switch means;
a first group of switch members responsive to actuation of said first solenoid means;
second solenoid means operative in response to energization of selected ones of said inputs of said second switch means;
a second group of switch members responsive to actuation of said second solenoid means; and
first and second circuit portions, each including unidirectional conductor means to isolate said inputs from one another;
said first circuit portion operatively connecting said first input switch means, some of said switch members of said first and second groups, said first solenoid means, and said ejectors of said first group; and
said second circuit portion operatively connecting said second input switch means, the remainder of said switch members of said first and second groups not used in said first circuit portion, said second solenoid means, and said ejectors of said second group and including one of said ejectors of said first group;
said first and second circuit portions being adapted to actuate said ejectors in accordance with the energization of said inputs of said switch means so as to dispense change in the fewest number of coins.

2. The circuit means as claimed in claim 1 in which said first group of ejectors includes a cent ejector; two two-cent ejectors, and a nickel ejector; and in which said second group of ejectors includes two dime ejectors, one quarter ejector, and one half-dollar ejector; said one of said ejectors of said first group being operatively connected in said second circuit portion being said nickel ejector.

3. The circuit means as claimed in claim 2 in which said first solenoid means includes first and second solenoid members, said first group of switch members including one normally-closed switch member which provides one energizing path to said nickel ejector, said last-named switch member being the sole switch member of said first group in said first circuit portion, and being adapted to open when said second solenoid member is energized; all the remaining said switch members of said first group being included in said second circuit portion;

and said unidirectional conductor means including unidirectional diodes.

4. The circuit means as claimed in claim 3 in which said second solenoid means includes first and second solenoid members, said second group of switch members including first and second normally closed switch members in series with each other to provide a second conducting path to said nickel ejector, said last-named first and second switch members being the only switch members of said second group in said first circuit portion and being adapted to open when said first and second solenoid members, respectively, of said second solenoid means are energized; all of the remaining said switch members of said second group being included in said second circuit portion.

5. The circuit means as claimed in claim 4 in which said inputs to said first input switch means are numbered from zero to nine inclusive corresponding to change amounting to zero to nine cents respectively;

said first and second solenoid members of said first solenoid means being energized each time one of said inputs marked five to nine inclusive is energized.

6. The circuit means as claimed in claim 5 in which said inputs to said second input switch means are numbered from zero to nine inclusive corresponding to change amounting to zero to ninety cents respectively;

said first solenoid member of said second solenoid means being energized each time said inputs of said second input switch means numbered two and seven are energized, and said second solenoid member of said second solenoid means being energized each time said inputs of said second input switch means numbered three, four, eight, and nine are energized.

References Cited

UNITED STATES PATENTS

| | | | |
|---|---|---|---|
| 2,910,991 | 11/1959 | Quinn et al. | 133—2 |
| 3,131,702 | 5/1964 | Buchholz et al. | 133—2 X |

STANLEY H. TOLLBERG, *Primary Examiner.*